United States Patent
Toya et al.

(10) Patent No.: US 6,819,020 B2
(45) Date of Patent: Nov. 16, 2004

(54) COMPACT ELECTRIC MOTOR

(75) Inventors: Kazuo Toya, Osaka (JP); Shozo Sakon, Fukui (JP); Kenichi Maeda, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/415,721

(22) PCT Filed: Nov. 5, 2001

(86) PCT No.: PCT/JP01/09657
§ 371 (c)(1),
(2), (4) Date: Aug. 28, 2003

(87) PCT Pub. No.: WO02/37645
PCT Pub. Date: May 10, 2002

(65) Prior Publication Data
US 2004/0051411 A1 Mar. 18, 2004

(30) Foreign Application Priority Data
Nov. 6, 2000 (JP) .................................. 2000-337110

(51) Int. Cl.⁷ ................................................. H02K 5/00
(52) U.S. Cl. ............................ 310/89; 310/90; 310/239
(58) Field of Search .......................... 310/89–90, 233, 310/239

(56) References Cited
U.S. PATENT DOCUMENTS

| | | | |
|---|---|---|---|
| 3,624,434 A | * 11/1971 | Dafler et al. | 310/60 R |
| 5,338,995 A | * 8/1994 | Takada | 310/89 |
| 5,576,586 A | 11/1996 | Blumenberg | |
| 5,751,088 A | * 5/1998 | Mukai et al. | 310/239 |
| 6,518,686 B2 | * 2/2003 | Campbell et al. | 310/239 |

FOREIGN PATENT DOCUMENTS

| | | |
|---|---|---|
| JP | 60-25361 | 2/1985 |
| JP | 1-109255 | 7/1989 |
| JP | 4-43378 | 4/1992 |
| JP | 4-111264 | 9/1992 |
| JP | 5-9174 | 2/1993 |
| JP | 7-39261 | 7/1995 |
| JP | 7322551 | 12/1995 |
| JP | 10023700 | 1/1998 |
| JP | 10108422 | 4/1998 |
| JP | 10322961 | 12/1998 |
| JP | 11098798 | 4/1999 |
| JP | 2000032700 | 1/2000 |

* cited by examiner

Primary Examiner—Thanh Lam
(74) Attorney, Agent, or Firm—RatnerPrestia

(57) ABSTRACT

The present invention provides for its object a compact electric motor effective to provide a high reliability against the leakage of grease from a bearing on one side adjacent the output shaft or the ingress of oil from a counterpart machine.

The compact electric motor 1 has a wall 14 having a predetermined gap around an output shaft 3 between a commutator 7 and a bearing 6, wherefore in the event of leakage of grease from the bearing 6 on an output side or ingress of oil from the counterpart machine, it is possible to prevent deposition on the commutator 3 and the brush 5 and, hence, to avoid an abnormal wear of the brush 5 and reduction in performance of the compact electric motor 1.

16 Claims, 7 Drawing Sheets

COMPACT ELECTRIC MOTOR

TECHNICAL FIELD

The present invention relates to a compact electric motor that is used in an environment where ingress of grease or oil is problematic, and also to an electric appliance such as ABS or the like utilizing such compact electric motor and an electric machine tool.

BACKGROUND ART

In recent years, the compact electric motor utilized in electric appliances and electric machine tools is required to have a high reliability while having lightweight and compact features.

The conventional compact electric motor is shown in FIG. 10. Referring to FIG. 10, reference numeral 1 represents a compact electric motor, reference numeral 2 represents a winding, reference numeral 3 represents an output shaft, reference numeral 4 represents an iron core, reference numeral 5 represents a brush, reference numerals 6 and 11 represent a bearing, reference numeral 7 represents a commutator, reference numeral 8 represents a rotor, reference numeral 9 represents a yoke, reference numeral 10 represents a bracket, reference numeral 12 represents a brush holder, and reference numeral 13 represents a permanent magnet.

The rotor 8 of the compact electric motor 1 is constituted by the iron core 4 of a generally circular shape having a plurality of slots, the winding 2 coiled and accommodated within the slots, the output shaft 3 extending axially through a center of the iron core 4 and fixed in position, and the commutator 7 fixed on the output shaft 3 and to which opposite ends of the winding 2 are electrically connected. This rotor 8 is covered by the yoke 9 of a close-ended hollowly cylindrical shape for rotatably accommodating the rotor 8 and having an inner peripheral surface on which a plurality of permanent magnets 13 are fixedly mounted. The bracket 10 is mounted to close an opening end of the yoke 9. This compact electric motor 1 of the structure described above is provided with the brush holder 12 inside the bracket 10 and the brush 5 accommodated in the brush holder 12 is slidingly engaged with the commutator 7.

DISCLOSURE OF THE INVENTION

However, with the above described construction, in the event of leakage of grease from a bearing on one side adjacent the output shaft or ingress of oil from a counterpart machine, there is a high possibility that it will deposit on the commutator and/or the brush, resulting in an abnormal wear of the brush and reduction in performance of the compact electric motor.

The present invention is intended to provide a compact electric motor effective to provide a high reliability against the leakage of grease from a bearing on one side adjacent the output shaft or the ingress of oil from a counterpart machine.

The compact electric motor according to the present invention is such that the bracket or the brush holder has a wall having a predetermined gap around the output shaft between the commutator and the bearing.

Thereby, in the event of leakage of grease from the bearing on one side adjacent the output shaft or ingress of oil from the counterpart machine, it is possible to prevent deposition on the commutator and the brush and, hence, to avoid an abnormal wear of the brush and reduction in performance of the compact electric motor and, accordingly, a high reliability as the compact electric motor that is used in such application can be obtained.

More specifically, the invention described in claim 1 of the present invention is a compact electric motor comprising: a rotor having a generally circular iron core with a plurality of slots, a winding wound and accommodated in the slots, an output shaft extending axially through a center of the iron core and fixed there and a commutator fixed on the output shaft and to which opposite ends of the winding are electrically connected; a casing (yoke) of a generally close-ended hollow cylindrical shape rotatably accommodating the rotor and having a plurality of permanent magnets fixed to an inner peripheral surface thereof; a bearing for rotatably supporting the output shaft; a bracket mounted to close an opening end of the casing with the output shaft penetrating through the bracket, and provided with a housing for accommodating the bearing; a brush slidingly engaged with the commutator; a brush holder disposed inside the bracket and accommodating the brush, characterized in that the bracket is provided with: a wall extending between the commutator and the bearing and having a predetermined gap around the shaft; a recessed portion formed at a portion of periphery of the housing and hollowing inward in the casing; a depleted portion formed by depleting a portion of the housing so as to allow a space between the bearing accommodated in the housing and the wall to be in communication with a recessed portion and, therefore, in the event of grease leakage from the output side bearing or ingress of oil from the counterpart machine, deposition on the commutator and the brush is prevented and abnormal wear of the brush and reduction in performance of the compact electric motor can be prevented to thereby provide the compact electric motor of a high reliability. Furthermore, there is an advantage that since when the amount of oil flowing into the compact electric motor increases, it flows from the depleted portion into the recessed portion there is no possibility of oil entering over the wall into the compact electric motor and, therefore, deposition on the commutator and the brush is prevented and abnormal wear of the brush and reduction in performance of the compact electric motor can be prevented to thereby provide the compact electric motor of a high reliability.

The invention described in claim 2 of the present invention is a compact electric motor comprising: a rotor having a generally circular iron core with a plurality of slots; a winding wound and accommodated in the slots, an output shaft extending axially through a center of the iron core and fixed thereto, and a commutator fixed on the output shaft and to which opposite ends of the winding are electrically connected; a casing (yoke) of a generally close-ended hollow cylindrical shape rotatably accommodating the rotor and having a plurality of permanent magnets fixed to an inner peripheral surface thereof; a bearing for rotatably supporting the output shaft; a brush slidingly engaged with the commutator; a brush holder disposed adjacent to an opening end of the casing and accommodating the brush, characterized in that the brush holder is constructed so as to close the opening end of the casing with the output shaft penetrating through the brush holder while accommodating the brush, and is provided with; a housing for accommodating the bearing; a wall extending between the commutator and the bearing and having a predetermined gap around the shaft; a recessed portion formed at a portion of periphery of the housing and hollowing inward in the casing; a depleted portion formed by depleting a portion of the housing so as to allow a space between the bearing accommodated in the housing and the wall to be in communication with a recessed portion and, therefore, in the event of grease leakage from the output side bearing or ingress of oil from the counterpart machine, deposition on the commutator and the brush is prevented and abnormal wear of the brush and reduction in performance of the compact electric motor can be prevented to thereby provide the compact electric motor of a high reliability. Furthermore, there is an advantage that the number of component parts can be reduced and compactization and reduction in weight are possible since the brush holder has the housing for accommodating the bearing, which closes the opening end of the casing with the output shaft penetrating through the housing. Still further, there is an advantage that since when the amount of oil flowing into the compact electric motor increases, it flows from the depleted portion into the recessed portion, there is no possibility of oil entering over the wall into the compact electric motor and, therefore, deposition on the commutator and the brush is prevented and abnormal wear of the brush and reduction in performance of the compact electric motor can be prevented to thereby provide the compact electric motor of a high reliability.

The invention described in claim 4 is characterized in that a shaft side end of the wall is provided with a projection protruding towards the bearing along the output shaft in the compact electric motor as claimed in any of claims 1 to 3 and, therefore, there is an advantage that there is no possibility of oil entering over the wall into the compact electric motor and, therefore, deposition on the commutator and the brush is prevented and abnormal wear of the brush and reduction in performance of the compact electric motor can be prevented to thereby provide the compact electric motor of a high reliability.

The invention described in claim 6 is characterized in that a breathing hole is formed by depleting a portion of the housing opposite to the depleted portion of the housing for allowing a space formed between the bearing accommodated in the housing and the wall to be in communication with a space out of the motor in the compact electric motor as claimed in any of claims 1 to 4 and, therefore, there is an advantage that formation of an oil film in the depleted portion can be prevented to allow it to flow into the recessed portion and there is no possibility of the oil flowing over the wall into the compact electric motor and, therefore, deposition on the commutator and the brush is prevented and abnormal wear of the brush and reduction in performance of the compact electric motor can be prevented to thereby provide the compact electric motor of a high reliability.

The invention described in claim 7 is characterized in that the recessed portion is provided so that it is located in a lower region beneath the brush accommodated in the brush holder in a vertical direction in a motor's mounted state in the compact electric motor as claimed in any of claims 1 to 6 and, therefore, there is an advantage that deposition on the commutator and the brush can be prevented even though the amount of oil or the like leaking into the compact electric motor is excessively so large as to overflow from the recessed portion and, therefore, the abnormal wear of the brush and reduction in performance of the compact electric motor can be prevented to thereby provide the compact electric motor of a high reliability.

The invention described in claim 8 is characterized in that a second wall is provided which is fastened or formed integrally with the shaft between the bearing and the wall having a predetermined gap around the shaft, the second wall extending along the wall having a predetermined gap around the shaft in the compact electric motor as claimed in any of claims 1 to 7 and, therefore, there is an advantage that since the labyrinth shape of the wall is taken relative to a mist of oil during the elevated temperature, ingress into inside the compact electric motor can be prevented and therefore, the abnormal wear of the brush and reduction in performance of the compact electric motor can be prevented, thereby to provide the compact electric motor of a high reliability.

The invention described in claim 9 is an electric appliance characterized by having the electric compact motor as claimed in any of claims 1 to 8 and, therefore, there is an advantage that the electric appliance having a high reliability can be obtained.

The invention described in claim 10 is characterized in that the electric appliance as claimed in claim 9 is an ABS device and, therefore, there is an advantage that the electric appliance having a high reliability can be obtained.

The invention described in claim 11 is an electrically driven machine tool characterized by having the electric compact motor as claimed in any of claims 1 to 8 and, therefore, there is an advantage that the electrically driven machine tool of a high reliability can be obtained.

BEST MODE FOR CARRYING OUT THE INVENTION

Hereinafter, embodiments of the present invention will be described with reference to the accompanying drawings.
(Embodiment 1)

Figure 1:
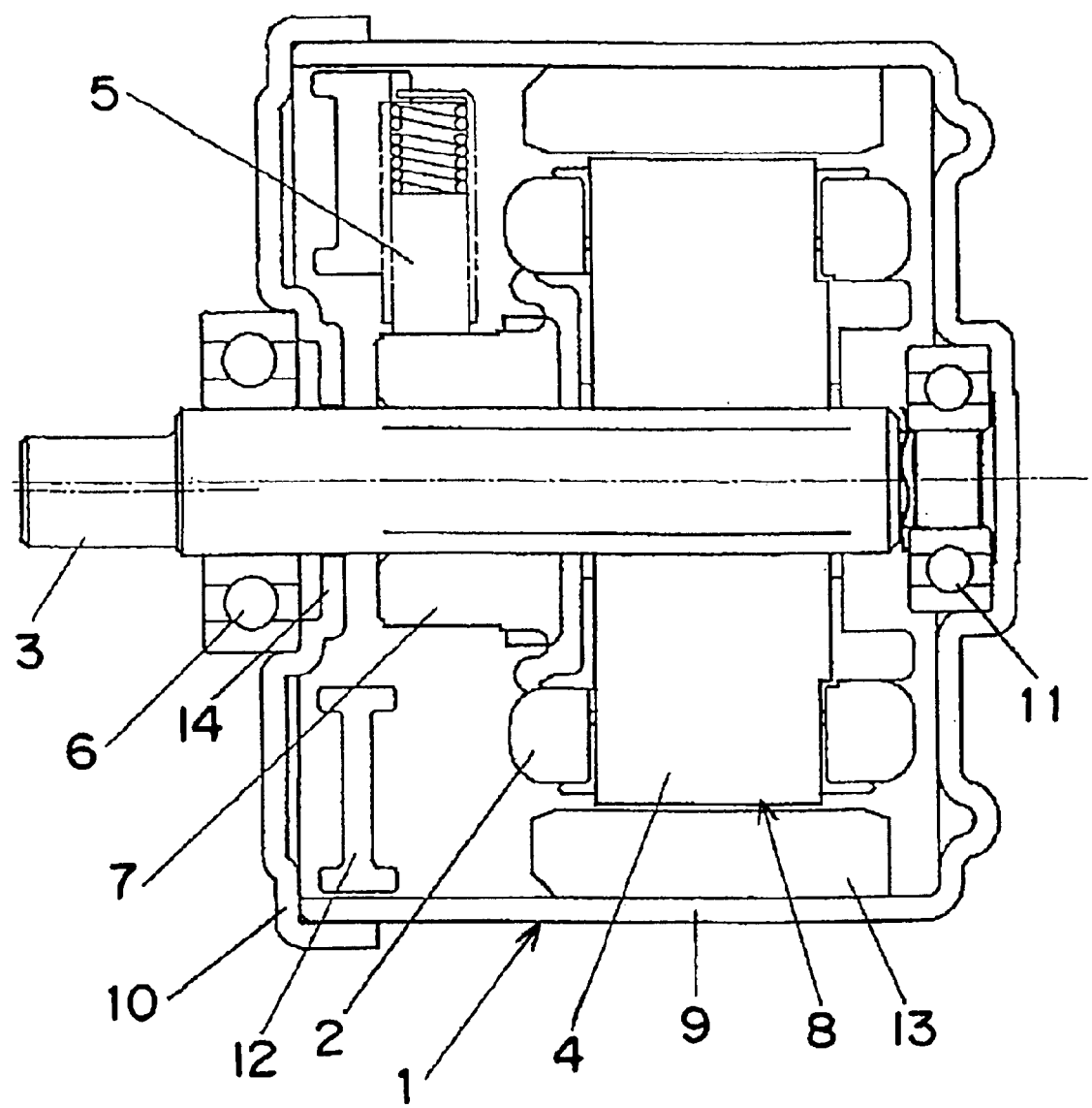
FIG. 1 is a sectional view of a compact electric motor in which a wall is integrally formed with a bracket according to the present invention.
Figure 2:
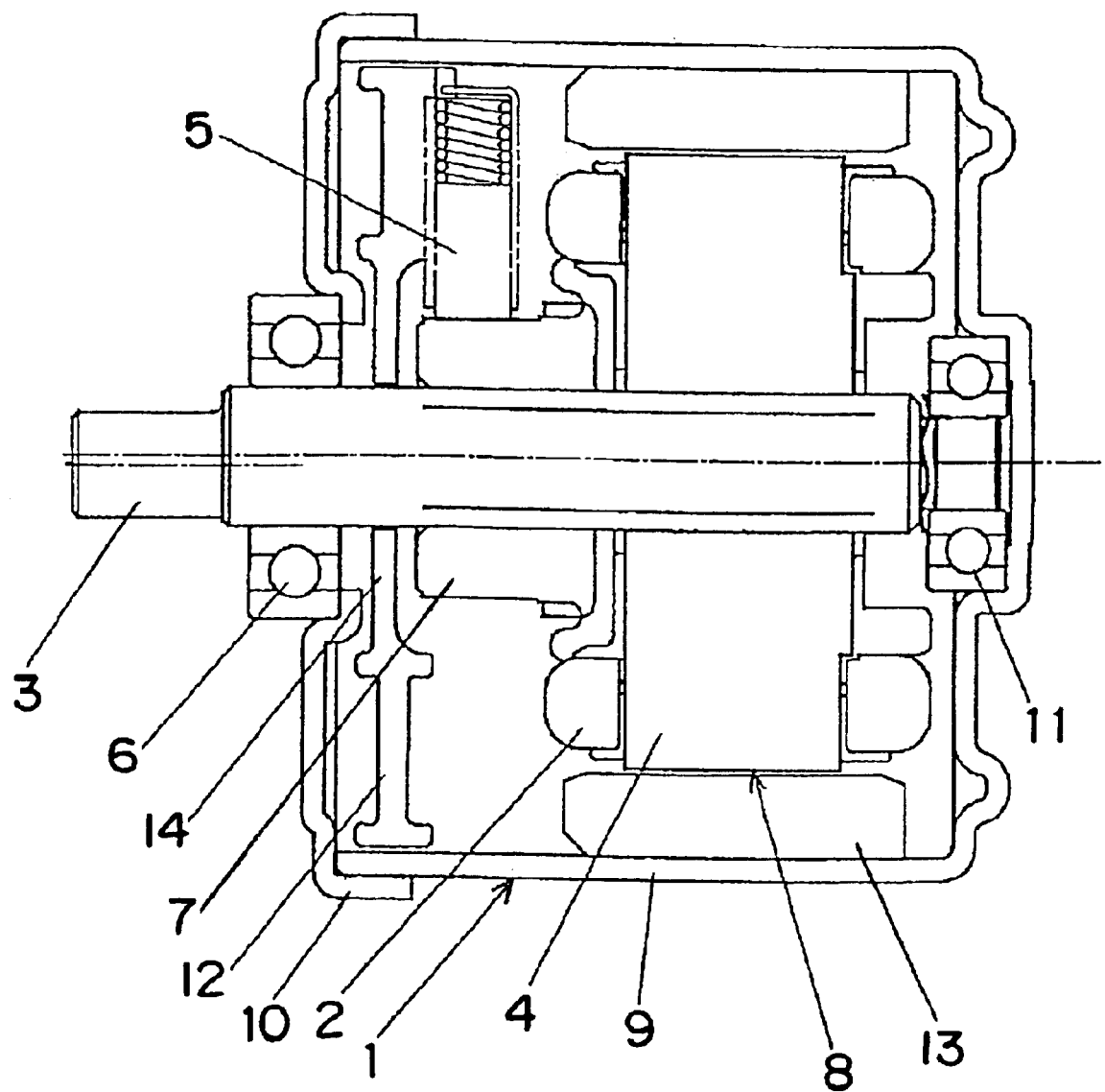
FIG. 2 is a sectional view of the compact electric motor in which the wall is integrally formed with a brush holder according to the present invention.
Figure 3:
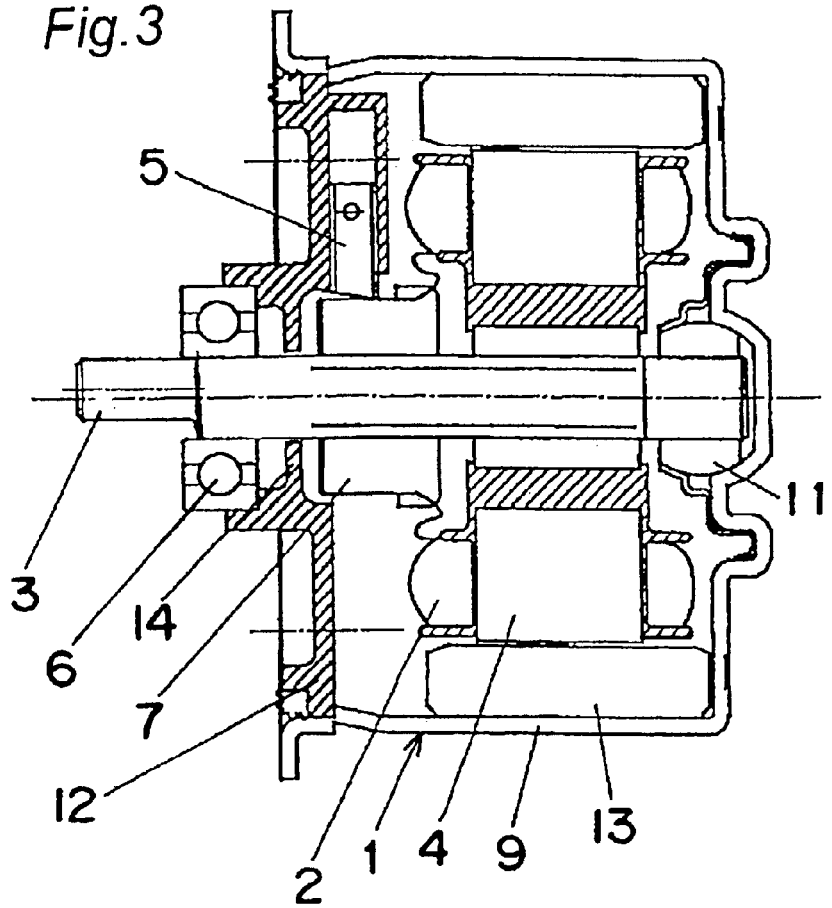
FIG. 3 is a sectional view of the compact electric motor in which a housing for a bearing is integrally formed with the brush holder formed with the wall according to the present invention.
Figure 10:
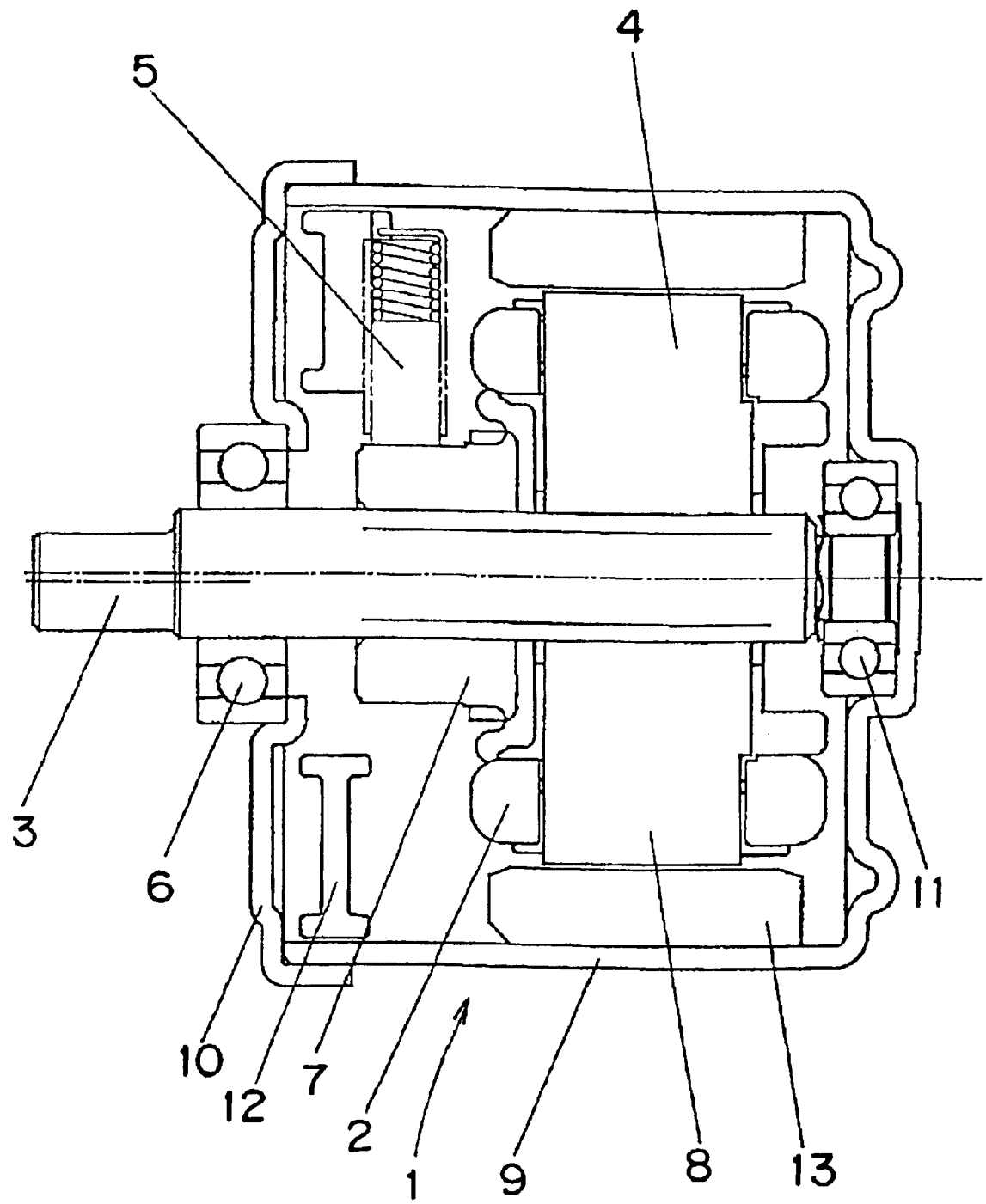
FIG. 10 is a sectional view of the conventional electric motor.

A compact electric motor according to a first embodiment of the present invention is shown in FIGS. 1 to 3. In FIG. 1, FIG. 2 and FIG. 3, reference numeral 14 represents a wall and, with respect to the other reference numerals, they are the same as those used in the conventional example (FIG. 10) and, therefore, description thereof is omitted.

The rotor 8 of the compact electric motor 1 is constituted by the iron core 4 of a generally circular shape having a plurality of slots, the winding 2 coiled and accommodated within the slots, the output shaft 3 extending axially through a center of the iron core 4 and fixed in position, and the commutator 7 fixed on the output shaft 3 and to which opposite ends of the winding 2 are electrically connected.

This rotor 8 is covered by the yoke 9 of a close-ended hollowly cylindrical shape for rotatably accommodating the rotor 8 and having an inner peripheral surface on which a plurality of permanent magnets 13 are fixedly mounted. The bracket 10 is mounted to close an opening end of the yoke 9.

This compact electric motor 1 of the structure described above is provided with the brush holder 12 inside the bracket 10 and the brush 5 accommodated in the brush holder 12 is slidingly engaged with the commutator 7.

On the other hand, provision of the wall 14 between the bearing 6 and the commutator 7 is effective to prevent deposition on the commutator 7 and/or the brush 5 in the event of grease leakage from the bearing 6 on an output side and, hence, to prevent an abnormal wear of the brush 5 and reduction in performance of the compact electric motor 1, thereby providing a highly reliable compact electric motor.

It is to be noted that the wall 14 is formed integrally with the bracket 10 as shown in FIG. 1 or with the brush holder 12 as shown in FIG. 2.

Figure 4:
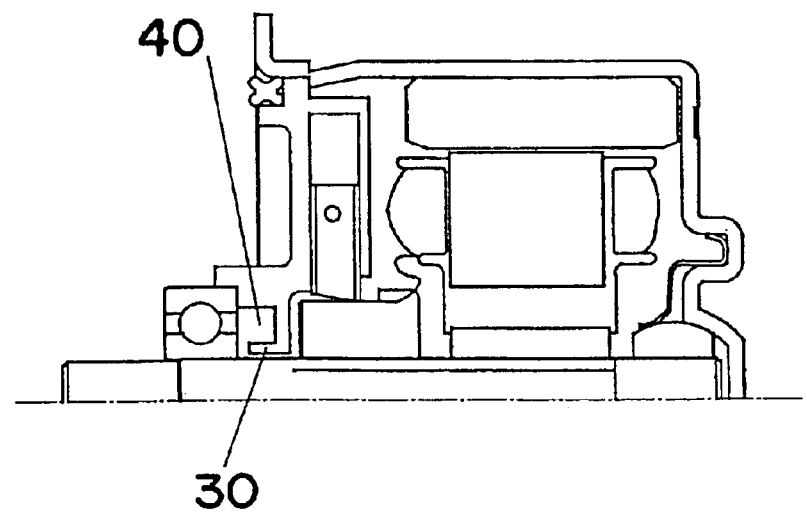
FIG. 4 is a sectional view of the compact electric motor in which an oil sump is formed according to the present invention.

Also, as shown in FIG. 3, when the brush holder 10 having the wall 14 is integrally formed with a housing for the bearing, the number of component parts used can be reduced and, as shown in FIG. 4, when one end of the wall 14 adjacent the shaft is provided with a projection 30 protruding towards the bearing 6, an oil sump 40 can be formed around an outer periphery of the projection 30 together with a housing for the bearing so that in the event of grease leakage from the bearing 6 on the output side or oil ingress from the counterpart machine grease or oil can be accommodated within the oil sump 40.

(Embodiment 2)

Figure 5:
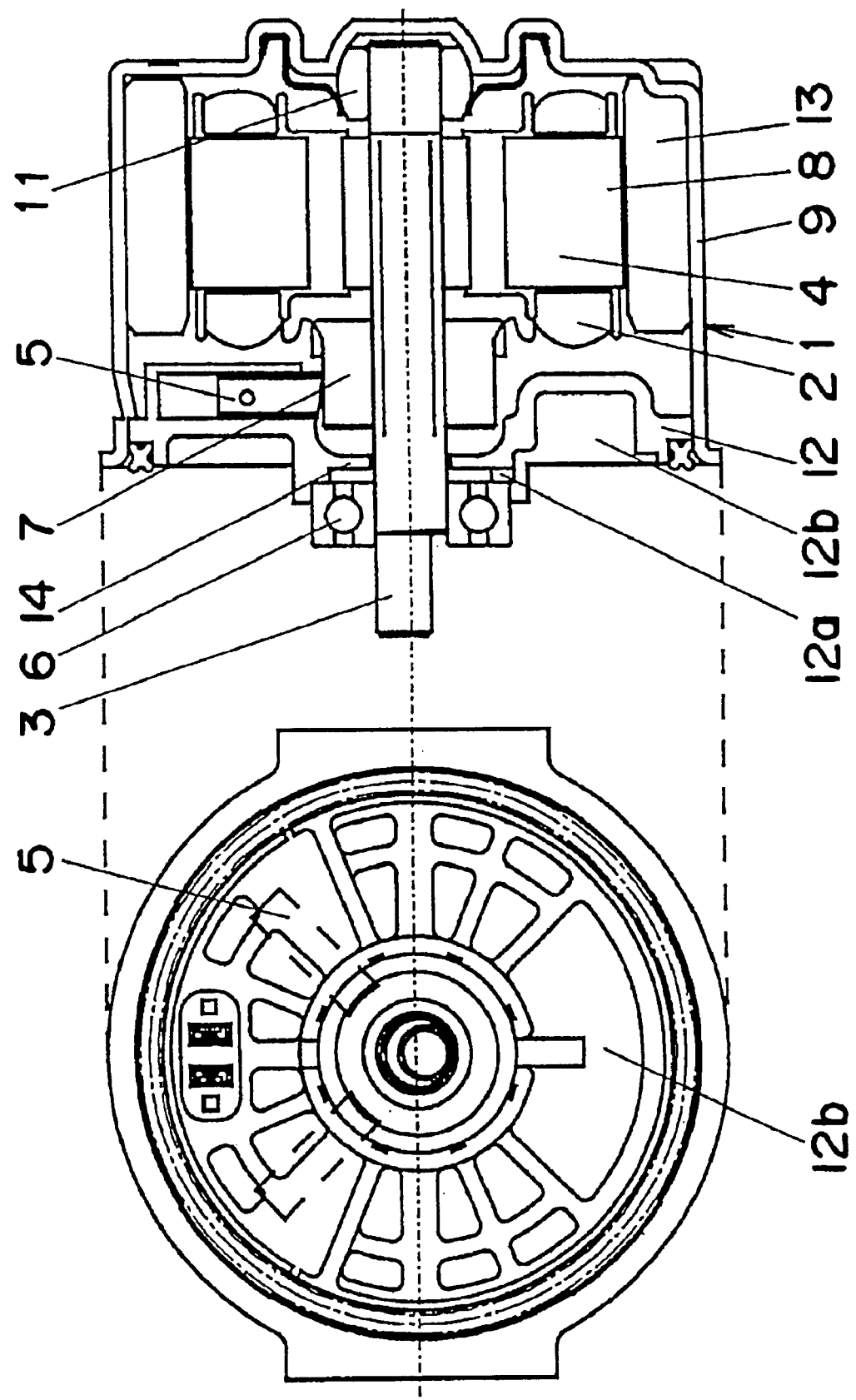
FIG. 5 is a sectional view of the compact electric motor in which a depleted portion and a recessed portion are formed according to the present invention.

A sectional view of the compact electric motor according to a second embodiment of the present invention is shown in FIG. 5. Referring to FIG. 5, reference numeral 12*a* represents a depleted portion formed by depleting a portion of the housing, and reference numeral 12*b* represents a recessed portion and, with respect to the other reference numerals, they are the same as those used in the Embodiment 1 (FIGS. 1 to 3) and the conventional example (FIG. 10) and, therefore, description thereof is omitted.

The brush holder 12 is formed with the depleted portion 12*a* formed by depleting a portion of the housing for the bearing 6 and the recess 12*b* is provided in communication with the depleted portion 12*a*. In the event that the amount of grease leaking from the output side bearing 6 or oil flowing from the counterpart machine into the compact electric motor 1 increases, it flows from the depleted portion 12*a* into the recessed portion 12*b* as if working as a reservoir tank and, therefore, there is no possibility of flowing over the wall 14 into the compact electric motor thereby to prevent deposition on the commutator 7 and the brush 5 and, accordingly, an abnormal wear of the brush 5 and reduction in performance of the compact electric motor can be prevented to provide the compact electric motor of a high reliability.

Figure 6:
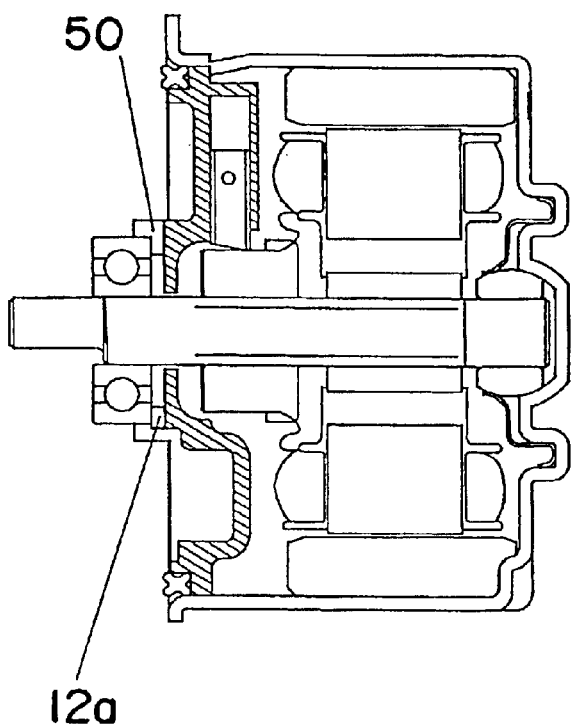
FIG. 6 is a sectional view of the compact electric motor in which a breathing hole 50 is provided together with the depleted portion 12a according to the present invention.

Also, as shown in FIG. 6, provision of a breathing hole 50 in the housing in a manner separate from the depleted portion 12*a* is effective to facilitate flow into the recessed portion 12*b*.

It is to be noted that even where the projection 30 is used and the oil. sump 40 is defined, oil or the like reserved in the oil sump 40 can flow from the depleted portion 12*a* into the recessed portion 12*b*.

Figure 7:
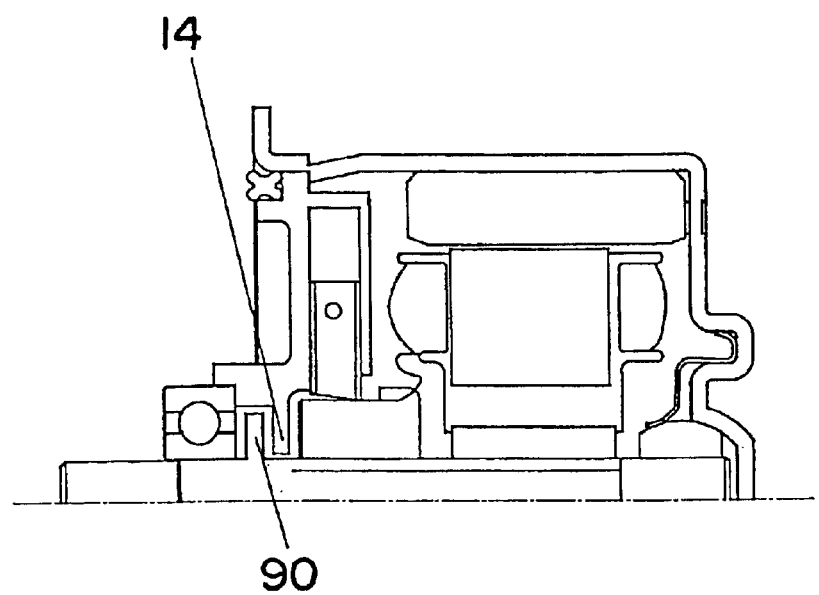
FIG. 7 is a sectional view of the compact electric motor provided with a labyrinth shape according to the present invention.

Also, with respect to a mist of oil during the elevated temperature, entry thereof can be prevented by configuring a labyrinth shape formed with a second wall 90 fastened or formed integrally with the shaft 6 between the bearing 6 and the wall 14 having a predetermined gap around the shaft between the bearing 6 and the commutator 7 as shown in FIG. 7.

(Embodiment 3)

Figure 8:
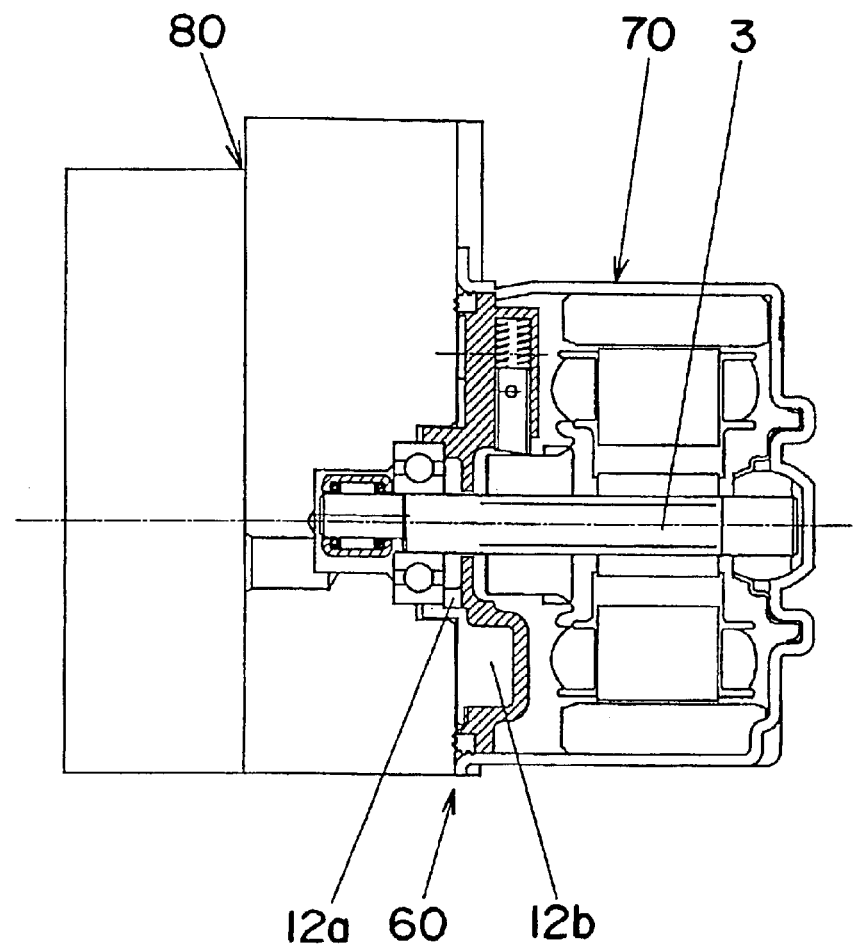
FIG. 8 is a sectional view of an ABS device according to the present invention.
Figure 9:
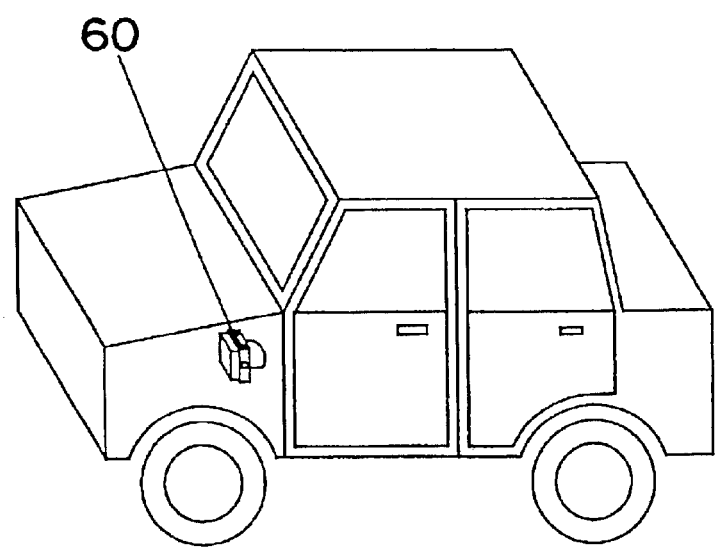
FIG. 9 is a perspective view of an automotive car having the ABS device mounted thereon according to the present invention.

An ABS device (a system capable of preventing a tire locking at the time of abrupt braking) utilizing the compact electric motor according to any of the. previously described Embodiments 1 and 2 is shown in FIG. 8 and an automotive car having such ABS device of FIG. 8 mounted thereon is shown in FIG. 9. It is to be noted that the compact electric motor shown in FIG. 5 is depicted in the ABS device shown in FIG. 8.

The use of the ABS device in automotive cars is nowadays increasing in response to increase of demands in the market for safety and ingress of grease used in the bearing 6 and/or other component parts 80 forming the ABS device into inside of the compact electric motor 70 can be prevented.

In other words, grease tending to ingress is reserved within the recessed portion 12*b* after having flown through a gap between the shaft 3 and the wall 14 and then from the depleted portion 12*a* that is open wide.

Also, if the respective positions of the brush 5 and the recessed portion 12*b* assume a symmetric relation with respect to a center line as shown in FIG. 5 and, for example, it is mounted on the automotive car as the ABS device as shown in FIG. 9 with the recessed portion 12*b* positioned in a lower region (Seen FIG. 5), deposition on the commutator and the brush can be prevented even though the amount of oil or the like leaking into the compact electric motor is excessively so large as to overflow from the recessed portion 12*b*, and therefore, the abnormal wear of the brush and reduction in performance of the compact electric motor can be prevented.

Accordingly, the ABS device shown in connection with this embodiment can maintain a reliability for a long period.

While in the foregoing description reference has been made to the ABS device, the present invention can be equally applied to an electrically driven machine tool and it is clear that even in such case similar effects can be obtained.

Thus, according to the present invention, since the wall is used having a predetermined gap around the shaft between the commutator and the bearing, in the event of grease leakage from the output side bearing and oil ingress from the counterpart machine, deposition on the commutator and the brush can be prevented and, hence, the abnormal wear of the brush and reduction in performance of the compact electric motor can be prevented, thereby providing the compact electric motor of a high reliability.

Also, formation of the wall integrally with the bracket or the brush holder or formation of the housing for the bearing in the brush holder is effective to reduce the number of component parts used in the structure of the compact electric motor.

Moreover, the provision of the projection around the shaft side end of the wall formed in the brush holder so as to protrude towards the bearing allows the oil sump to be defined by the projection and the housing for the bearing at the outer periphery of the projection and, accordingly, grease leakage and the ingress of oil from the counterpart machine can assuredly be avoided.

Also, provision of the depleted portion in a portion of the housing for the bearing and the recessed portion in communication with the depleted portion is effective to prevent flow from the depleted portion into the recessed portion and over the wall into the compact electric motor even when the amount of oil flowing into the compact electric motor increases, and the provision of the breathing hole together with the depleted portion facilitates the flow.

Yet, configuration of the labyrinth shape formed with the wall fastened or formed integrally with the shaft between the bearing and the wall having a predetermined gap around the shaft between the bearing and the commutator is effective to avoid ingress of a mist of oil during the elevated temperature.

And, a highly reliable equipment can be achieved by utilizing the compact electric motor having the peculiar features described above as a motor in the electric appliance such as the ABS device or the like and the electrically driven machine tool.

What is claimed is:

1. A compact electric motor comprising a rotor having a generally circular iron core with a plurality of slots, a winding wound and accommodated in the slots, an output shaft extending axially through a center of the iron core and fixed thereto, and a commutator fixed on the output shaft and to which opposite ends of the winding are electrically connected; a casing (yoke) of a generally close-ended hollow cylindrical shape rotatably accommodating the rotor and having a plurality of permanent magnets fixed to an inner peripheral surface thereof; a bearing for rotatably supporting the output shaft; a bracket mounted to close an opening end of the casing with the output shaft penetrating through the bracket, and provided with a housing for accommodating the bearing; a brush slidingly engaged with the commutator; a brush holder disposed inside the bracket and and accommodating the brush, characterized in that the bracket is provided with:

a wall extending between the commutator and the bearing and having a predetermined gap around the shaft;

a recessed portion formed at a portion of periphery of the housing and hollowing inward in the casing;

a depleted portion formed by depicting a portion of the housing so as to allow a space between the bearing accommodated in the housing and the wall to be in communication with a recessed portion.

2. A compact electric motor comprising; a rotor having a generally circular iron core with a plurality of slots, a winding wound and accommodated in the slots, an output shaft extending axially through a center of the iron core and fixed thereto, and a commutator fixed on the output shaft and to which opposite ends of the winding are electrically connected; a casing (yoke) of a generally close-ended hollow cylindrical shape rotatably accommodating the rotor and having a plurality of permanent magnets fixed to an inner peripheral surface thereof; a bearing for rotatably supporting the output shaft; a brush slidingly engaged with the commutator; a brush holder disposed adjacent to an opening end of the casing and accommodating the brush, characterized in that the brush holder is constructed so as to close the opening end of the casing with the output shaft penetrating through the brush holder while accommodating the brush, and is provided with:

a housing for accommodating the bearing;

a wall extending between the commutator and the bearing and having a predetermined gap around the shaft:

a recessed portion formed at a portion of periphery of the housing and hollowing inward in the casing;

a depleted portion formed by depleting a portion of the housing so as to allow a space between the bearing accommodated in the housing and the wall to be in communication with a recessed portion.

3. The compact electric motor as claimed in claim 1, wherein a shaft side end of the wall is provided with a projection 30 protruding towards the bearing 6 along the output shaft.

4. The compact electric motor as claimed in claim 1, wherein a breathing hole is formed by depleting a portion of the housing opposite to the depleted portion of the housing for allowing a space formed between the bearing accommodated in the housing and the wall to be in communication with a space out of the motor.

5. The compact electric motor as claimed in claim 1, wherein the recessed portion is provided so that it is located in a lower region beneath the brush accommodated in the brush holder in a vertical direction in a motor's mounted state.

6. The compact electric motor as claimed in claim 1, wherein a second wall is provided which is fastened or formed integrally with the shaft between the bearing and the wall and extending along the wall.

7. An electric appliance characterized by having the electric compact motor as claimed in claim 1.

8. An electric appliance as claimed in claim 7 characterized in that the electric appliance is an ABS device.

9. An electrically driven machine tool characterized by having the electric compact motor as claimed in claim 1.

10. The compact electric motor as claimed in claim 2, wherein a shaft side end of the wall is provided with a projection protruding towards the bearing along the output shaft.

11. The compact electric motor as claimed in claim 2 wherein a breathing hole is formed by depleting a portion of the housing opposite to the depleted portion of the housing for allowing a space formed between the bearing accommodated in the housing and the wall to be in communication with a space out of the motor.

12. The compact electric motor as claimed in claim 2, wherein the recessed portion is provided so that it is located in a lower region beneath the brush accommodated in the brush holder in a vertical direction in a motor's mounted state.

13. The compact electric motor as claimed in claim 2, wherein a second wall is provided which is fastened or formed integrally with the shaft between the bearing and the wall and extending along the wall.

14. An electric appliance characterized by having the electric compact motor as claimed in claim 2.

15. An electric appliance as claimed in claim 14, characterized in that the electric appliance is an ABS device.

16. An electrically driven machine tool characterized by having the electric compact motor as claimed in claim 2.

* * * * *